US 6,690,298 B1

(12) United States Patent
Barber et al.

(10) Patent No.: US 6,690,298 B1
(45) Date of Patent: Feb. 10, 2004

(54) ENHANCED VERTICAL TERRAIN PROFILE DISPLAY

(75) Inventors: Sarah Barber, Robins, IA (US); Roger D. Burns, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 58 days.

(21) Appl. No.: 10/055,644

(22) Filed: Jan. 23, 2002

(51) Int. Cl.$^7$ .............................................. G01C 21/00
(52) U.S. Cl. ...................................... 340/971; 340/979
(58) Field of Search ................................ 340/945, 971, 340/979, 980, 961, 963; 342/120, 121

(56) References Cited

U.S. PATENT DOCUMENTS

| | | | |
|---|---|---|---|
| 4,224,669 A | 9/1980 | Brame | 340/970 |
| 5,781,146 A | 7/1998 | Frederick | 342/26 |
| 5,936,552 A | 8/1999 | Wichgers et al. | 340/963 |
| 6,057,786 A * | 5/2000 | Briffe et al. | 340/975 |
| 6,362,776 B1 * | 3/2002 | Hager et al. | 342/121 |

FOREIGN PATENT DOCUMENTS

WO     WO 01/20583 A2 * 3/2001

* cited by examiner

*Primary Examiner*—Van Trieu
(74) *Attorney, Agent, or Firm*—Nathan O. Jensen; Kyle Eppele

(57) ABSTRACT

A flight display for use in an avionics system has a visual display format to show an enhanced vertical situation of an aircraft. Included is a vertical terrain profile display that displays terrain in front of the aircraft over a selected range and a selected swathe width. The vertical terrain profile display shows a side-on terrain profile view with a digital display of the selected swathe width and a display of range in front of the aircraft. A plan view of the aircraft position is included that shows swathe lines on either side of an aircraft to show the selected swathe width. A means for selecting the swathe width by the pilot is provided. The flight display the vertical terrain profile display may be changed into a end-on vertical terrain profile view over the selected swathe width. The end-on terrain profile view has a digital display of the selected range and a digital display of the selected swathe width on each side of the aircraft.

21 Claims, 3 Drawing Sheets

ENHANCED VERTICAL TERRAIN PROFILE DISPLAY

BACKGROUND OF THE INVENTION

This invention relates to avionics systems, flight displays, and more particularly to enhancements in the display of a vertical terrain profile (VTP) on an avionics flight display for providing a real-time, dynamic display of any terrain hazards so as to prevent controlled flight into terrain (CFIT). Controlled flight into terrain continues to plague air travel as one of the leading causes of fatal aircraft crashes.

Improved methods of alerting a flight crew of potential CFIT conditions have been developed as a result of technology advancements. These technology enhancements include accurate aircraft present position information, terrain data and suitable storage means, and computer processing resources. One such improved alerting system is referred to as a Ground Collision Avoidance System (GCAS). The GCAS system utilizes aircraft present position information, aircraft state information, and a digital terrain database to determine a flight path of an aircraft relative to the surrounding terrain. Such a system is described in U.S. Pat. No. 4,224,669 herein incorporated by reference in its entirety.

Terrain awareness displays that use a format that provides a pilot or flight crew with complete situational awareness of potential terrain hazards to the aircraft are known. Positional information and terrain data in a database are used to display horizontal and vertical terrain information on a flight display. The information is formatted to provide an interface that provides the data conveniently, simply, and intuitively in a format that is easily assimilated and interpreted by a human operator. Such a terrain awareness display is disclosed in U.S. Pat. No. 5,936,552 herein incorporated by reference in its entirety. Shown in this reference is a vertical terrain profile for a terrain path in a line directly in front of the aircraft out to a selected distance.

Vertical terrain profiles may be shown on primary flight displays (PFD) and multifunction displays (MFD) or other display means on an aircraft. What is typically presented to a pilot on a PFD or MFD is a vertical terrain profile in front of an aircraft out to a preselected range. A problem with the vertical terrain profile is that the terrain representation is interpreted through software routines that automatically define a swathe along and either side of the aircraft horizontal flight path or heading/track. This swathe is predefined and the pilot has no control over its width. Moreover, the swathe is completely hidden from the pilot who has no visual cue as to the swathe width currently being used to interpret the terrain data.

What is needed is vertical terrain profile display that displays swathe width information in various formats and allows a pilot to select the swathe width to further enhance the situation awareness of a pilot to prevent CFIT accidents.

SUMMARY OF THE INVENTION

A flight display for use in an avionics system is disclosed. The flight display has a visual display format to show an enhanced vertical situation of an aircraft comprising a vertical terrain profile display of terrain in front of the aircraft over a selected range and a selected swathe width. The vertical terrain profile display shows a side-on terrain profile view that includes a digital display of the selected swathe width and a digital display of range in front of the aircraft in predetermined increments up to the selected range. The flight display includes a plan view of the aircraft position that further comprises swathe lines on either side of an aircraft showing the selected swathe width. The flight display also includes a means for selecting the swathe width.

The flight display also includes means for changing the vertical terrain profile display into a end-on vertical terrain profile view over the selected swathe width. The end-on terrain profile view also includes a digital display of the selected range and a digital display of the selected swathe width on each side of the aircraft on the end-on terrain profile view.

The flight display plan view may be a compass display with the swathe lines projecting forward and parallel to an aircraft heading/track. The plan view may also be a map display with the swathe lines following an aircraft flight path.

The side-on terrain profile view, the end-on terrain profile view, and the swathe lines may be shown in red on the vertical terrain profile display when the terrain is at or above an aircraft altitude.

The means for selecting the swathe width and for changing the vertical terrain profile display may be a knob, joystick, toggle switch, pushbutton or line select key.

It is an object of the present invention to enhance situational awareness of a pilot by providing enhanced vertical terrain profile views on a flight display.

It is an object of the present invention to provide a pilot a means and method to select and display a swathe width of a vertical terrain profile view.

It is an advantage of the present invention to provide a pilot a means and method of selecting a side-on and end-on vertical terrain profile view.

It is an advantage of the present invention to provide a pilot a plan view showing a selected vertical terrain profile swathe width.

It is a feature of the present invention to present terrain information in color with red indicating terrain at an altitude equal to or greater than that of an aircraft.

It is a feature of the present invention to present terrain information in color with yellow indicating terrain at an altitude within a predetermined distance below an aircraft.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
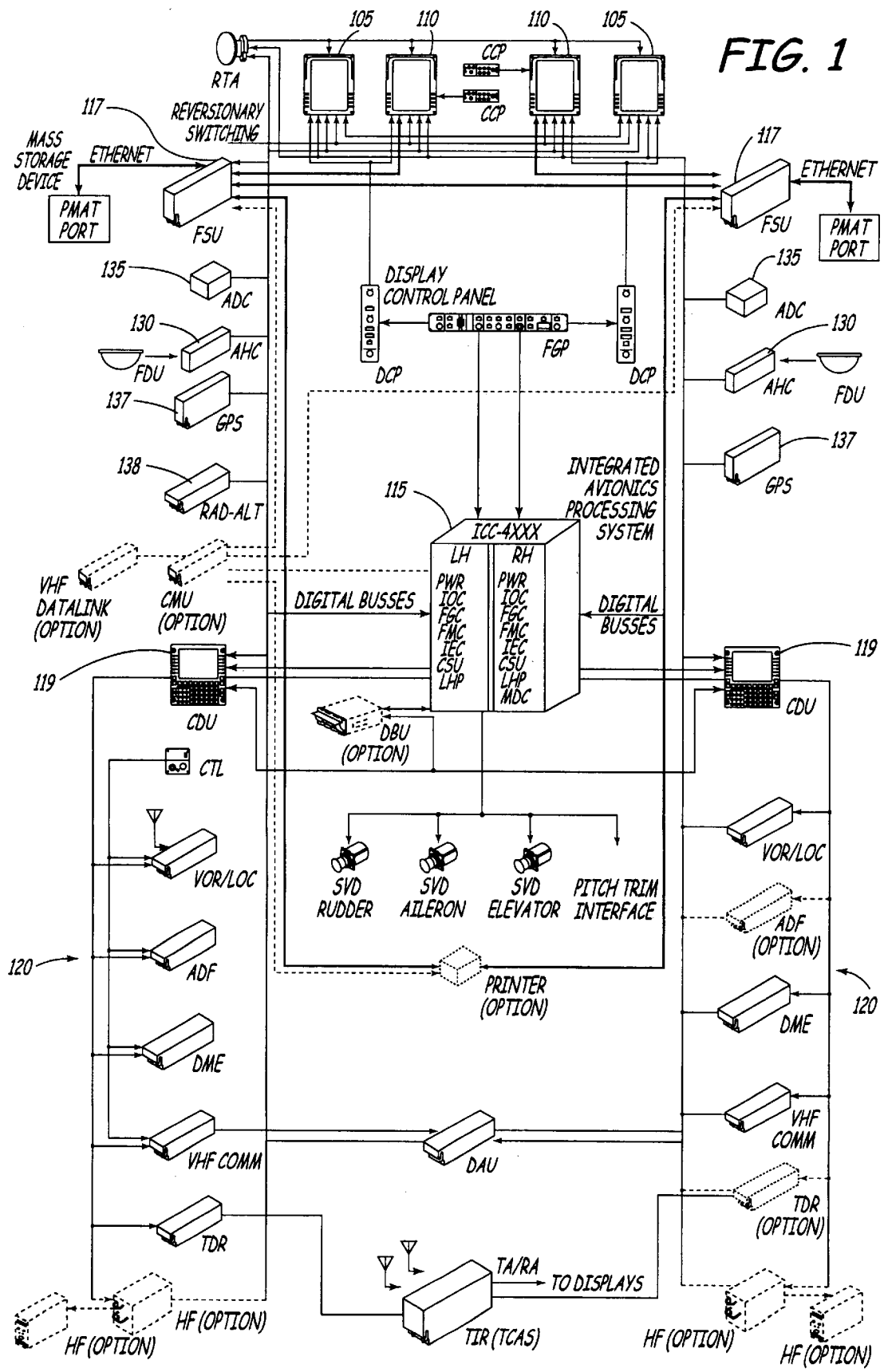
FIG. 1 is block diagram of an avionics system incorporating the present invention.

A typical avionics system 100 that may employ the present invention is shown in exemplary fashion in FIG. 1. The avionics system 100 shown in FIG. 1 is intended for installations in such aircraft as business aircraft, airliners, and other large aircraft. An avionics system such as that shown in FIG. 1 is manufactured by the assignee of the present invention Rockwell Collins Inc.

The avionics system 100 shown in FIG. 1 may have two electronic flight displays that function as a primary flight display (PFD) 105 and a multifunction display (MFD) 110. Alternate numbers of displays may be used. A PFD 105 and an MFD 110 are typically mounted in front of both a pilot and a copilot. To allow for the failure of either the PFD 105 or the MFD 110, each is capable of being pilot-configured to a PFD/MFD format. The PFD/MFD format provides all the instrumentation required for the safe operation of the aircraft. A cursor control panel (CCP) 145 is connected to the MFD 110 to access and manipulate features available on the MFD 110. A CCP 145 is available to both the pilot and copilot.

Also include in the avionics system 100 is an integrated avionics processing system (IAPS) 115 that performs part of the integration functions to interconnect and manage the various avionics subsystems in an aircraft. Included in the IAPS 115 are such items as flight control computers, flight management computers, and maintenance diagnostic computers. Dual cockpit control units (CDU) 119 are provided for integrated multisensor navigation, flight maintenance and execution, sensor control, MFD 110 map support, communications equipment control, and other controls to the avionics system 100. Dual file server units (FSU) 117 provide processing and mass storage databases for the avionics system 100. Two FSUs 117 are provide in the typical system of FIG. 1 for redundancy. Each FSU 117 provides full functionality The FSUs are used to store terrain data and other databases used by the avionics system 100. Various data buses including Ethernet buses interconnect and transfer data between the components in the avionics system 100 as shown by the interconnect lines in FIG. 1. Other components in the typical avionics system 100 are air data computers (ADC) 135, engine indication system (not shown), attitude heading computers (AHC) 130, GPS receivers 137, and a radio altimeter 138. Also connected to the avionics system 100 are various radio systems 120 and their associated antennas. These radio sensors may include VOR/LOC, ADF, DME, ILS, and MLS systems to provide navigational information.

Figure 2:
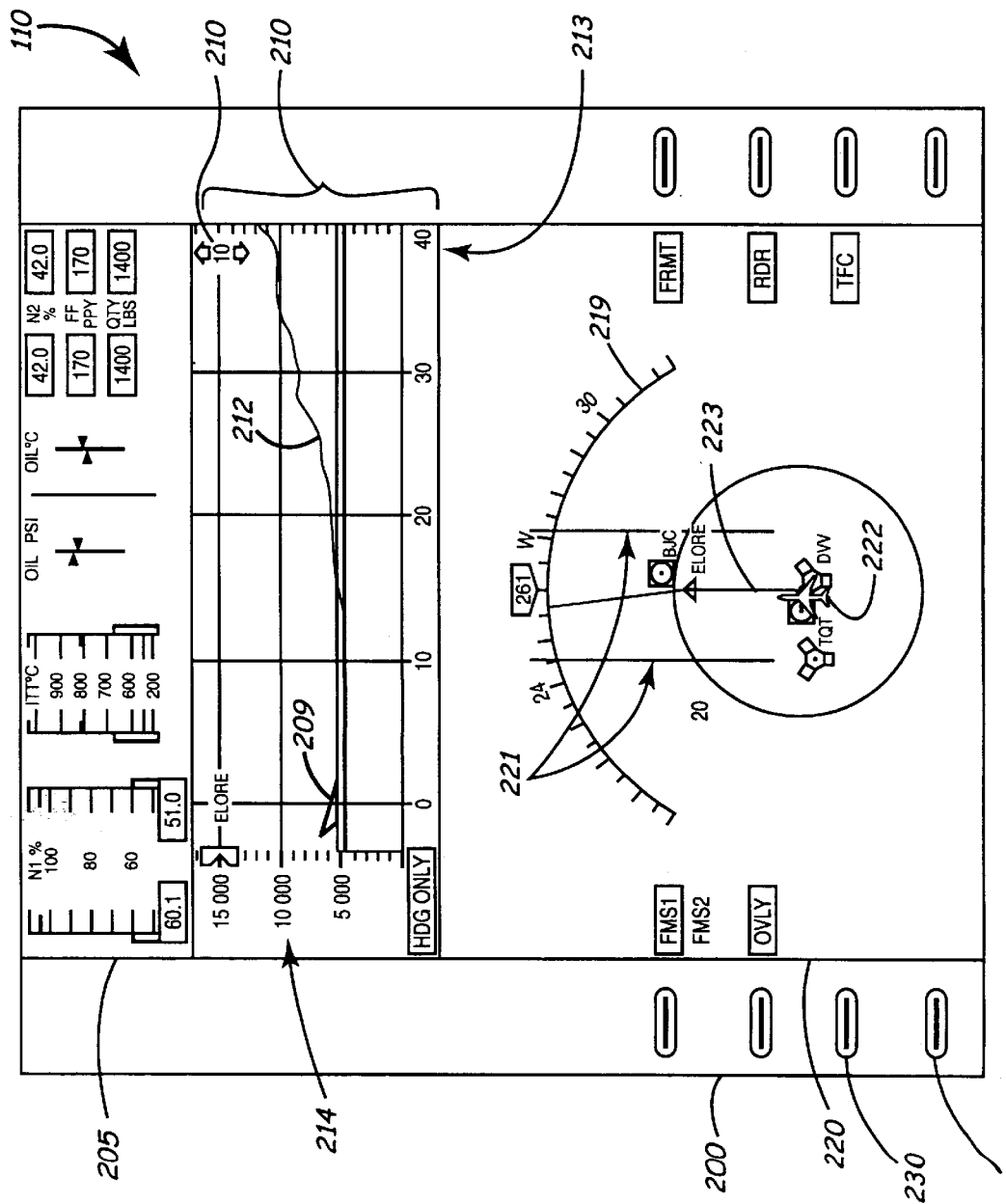
FIG. 2 is a diagram showing a multifunction display having a side-on vertical terrain profile display and a plan view display incorporating the present invention.

A typical MFD 110 front panel 200 including bezel mounted line select keys is shown in FIG. 2. The upper region 205 of the MFD 110 is used to display the EIS (engine indication system) data. NI (turbine fan speed), ITT (inter-turbine temperature), fuel quantity, N2, fuel flow, oil pressure and temperature are displayed in FIG. 2.

A lower region 220 of the MFD front panel 200 is used to display a plan view having compass rose or arc 219 or optional map navigation format as selected by the pilot. A compass arc is shown in FIG. 2 with a horizontal display aircraft symbol 222 indicating the aircraft position and an aircraft heading 223 displayed on the compass arc 219. The space to either side of the rose, arc, or map format is used to display a lateral navigation data field, a weather radar mode field, system messages and selected menu data. Normal control, reversion, and warning annunciations are also displayed.

Shown on the MFD 110 in FIG. 2 is a vertical terrain profile (VTP) display 210 with an aircraft symbol 209 indicating the aircraft altitude. The VTP display 210 presents to the pilot a side-on vertical terrain profile view of the aircraft 209 vertical situation in FIG. 2. The VTP display 210 format is obtained by determining aircraft location from such position determination means on board the aircraft such as the GPS receiver 137 in FIG. 1. The position, altitude, and heading/track of the aircraft are used with the terrain database information in the database of the FSU 117 to form a side-on vertical terrain profile 212 in the FSU 117 processor and pass the data to the MFD 110 for display. The side-on vertical terrain profile 212 is shown out to a selected range (213), b 40miles in this example. This selected range 213 corresponds to the pilot-selected range of the map navigation format that may be displayed in the lower region plan view 220 of the MFD 110. The vertical terrain profile display 210 may also be used to show an aircraft vertical flight path and waypoint locations (not shown). Also shown in the VTP display 210 in the side-on vertical terrain profile view are altitude indications 214 to the, left and increments (10 miles in this example) in the selected range 213 along the bottom of the VTP display 210. The altitude of the aircraft 209 on the VTP display 210 may be determined from the altimeter 138 or the GPS receiver 137 in the avionics system 100 of FIG. 1.

A problem with the VTP display 210 in FIG. 2 in prior art systems is that the terrain representation is interpreted through software that automatically define a swathe along either side of the aircraft's horizontal flight path or heading. The swathe width is predefined and the pilot has no control over its width.

An enhancement to the VTP display 210 of the present invention is to provide the pilot with a manual means of controlling the swathe width and displaying a current setting as a digital display 215 in the VTP display 210. The digital display 215 in the example of FIG. 2 is showing the swathe width as 10 miles on either side of the aircraft 209. A variety of means for selecting a swathe width may be utilized. These include such controls as a knob, pushbutton, toggle select key 230 on the MFD 110 shown in FIG. 2 may also be used to perform the selection function. The side-on vertical terrain profile 212 on the VTP display 210 represents the worst case terrain elevation across the swathe for each increment along the forward path or track.

An additional enhancement to the MFD 110 in FIG. 2 of the present invention is to help increase the situational awareness of the pilot relative to the swathe of terrain that is being interpreted by graphically depicting the swathe width as two swathe lines 221 on the plan view 220 map or compass display. The aircraft 222 having a flight path or heading 223 is located on the plan view 220 compass or flight plan map display. The two lines 221 are located on either side of the aircraft flight path or heading 223 and will move in and out as the swathe width control line select key 230 is activated. Lines 221 will either project directly forward if the VTP 210 is in heading-only mode or follow the shape of a flight path if the VTP 210 is in a flight plan mode (not shown).

Figure 3:
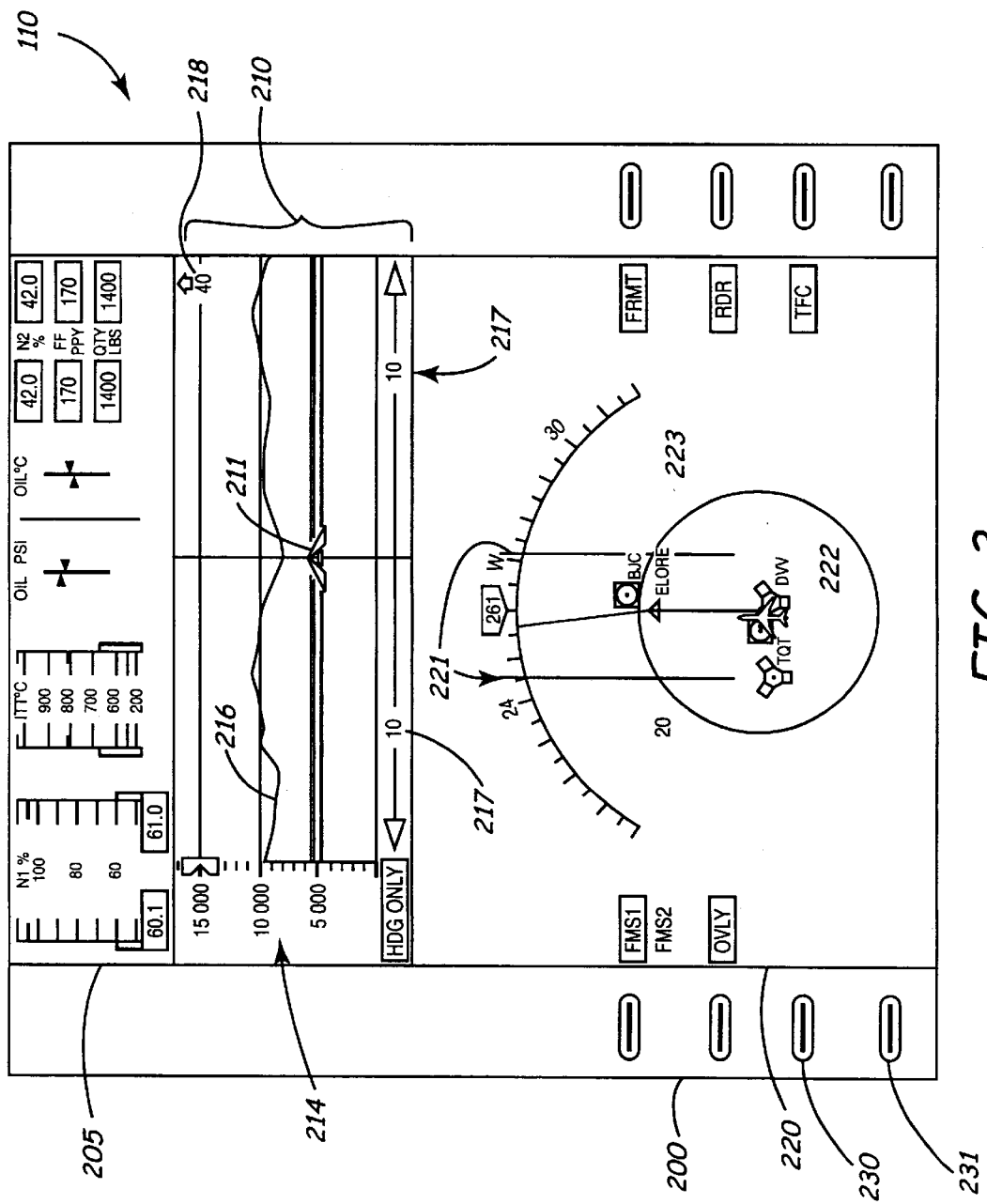
FIG. 3 is a diagram showing the multifunction display of FIG. 2 with an end-on vertical terrain profile display format of the present invention.

An additional enhancement to a VTP display 210 of the present invention is shown in FIG. 3. In FIG. 3 the side-on vertical terrain profile view with side on vertical terrain profile 212 of the VTP display 210 is changed to a look-ahead or end-on vertical terrain profile view with an end-on vertical terrain profile 216. The end-on terrain profile 216 is forward along the flight path and to either side of the flight path to a distance as selected for the current swathe. In FIG. 3, the current selected swathe is shown as 10 miles (217) on either side of an aircraft end-on vertical display symbol 211. The pilot is able to change from the side-on terrain profile 212 of FIG. 2 to the end-on terrain profile 216 of FIG. 3 by using a suitable control such as a knob, pushbutton, joystick, or toggle switch located on the cursor control panel 145. A line select key 231 on the MFD 110 shown in FIG. 2 may also be used to perform the selection function. With the end-on vertical terrain profile view, the pilot may see where a high point in the vertical terrain profile 216 occurs on the right or left of the aircraft 211. With the end-on vertical terrain view, the side-view swathe width indicator 215 of FIG. 2 now shows a horizontal map range 218 in FIG. 3. The plan view 220 map or compass display of FIG. 2 remains the same in FIG. 3 with the swathe lines 221 located on either side of the aircraft 222 heading as before.

The VTP display 210 may be used to present terrain information in three colors. If the terrain is at or above the aircraft 209 altitude in the side-on view or aircraft 211 altitude in the end-on view, the side-on vertical terrain profile 212 or the end-on vertical terrain profile 216 will be depicted in red. If the terrain is within a predetermined distance such as 1000 feet below the aircraft 209 or 211, the side-on or end-on vertical terrain profile 212 or 216 will be depicted in yellow. If the terrain is lower than 1000 feet below the aircraft, the terrain profiles 212 or 216 will be depicted in brown. The swathe lines 221 on the compass or flight plan display 220 will be displayed in the worst case color currently indicated on the VTP display 210. For example, if any red terrain is visible on the VTP display 210, the swathe lines 221 will be in red. Other colors may be used to make these display indications.

The present invention is described above as being implemented on a multifunction display in an avionics system. As described above the multifunction display and a primary flight display may be utilized interchangeably and the present invention may also be used interchangeably on these flight displays. In addition, other types of flight displays for displaying vertical terrain profiles may be used to incorporate the present invention.

It is believed that the enhanced vertical terrain profile display of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An avionics system having a flight display with a display format to show an enhanced vertical situation of an aircraft said flight display comprising:
    a vertical terrain profile display of terrain in front of the aircraft over a selected range and a selected swathe width said vertical terrain profile display having a side-on vertical terrain profile view further comprising:
    a side-on vertical terrain profile;
    a side-on vertical aircraft symbol showing an altitude and position of the aircraft;
    a digital display of the selected swathe width;
    a display of range in front of the aircraft in predetermined increments up to the selected range on the side-on profile view; and
    a plan view display of the aircraft position said plan view further comprising:
    a horizontal display aircraft symbol;
    swathe lines on either side of a the horizontal aircraft symbol showing the selected swathe width; and
    a manual means for selecting the swathe width.

2. The flight display of claim 1 further comprising means for changing the vertical terrain profile display side-on view Into a end-on vertical terrain profile view over the selected swathe width said end-on terrain profile view further comprising:
    an end-on vertical terrain profile;
    an end-on vertical display aircraft symbol;
    a digital display of the selected range on the end-on terrain profile view; and
    a display of the selected swathe width on each side of the aircraft on the end-on terrain profile view.

3. The flight display of claim 2 wherein the side-on terrain profile, the end-on terrain profile, and the swathe lines are shown in red on the vertical terrain profile display when the terrain is at or above the aircraft altitude.

4. The flight display of claim 2 wherein the side-on terrain profile, the end-on terrain profile, and the swathe lines are shown in yellow on the vertical terrain profile display when the terrain is with a predetermined distance below the aircraft altitude.

5. The flight display of claim 2 wherein the manual means for changing the vertical terrain profile display comprises one of the group comprising a knob, joystick, toggle switch, pushbutton, and line select key.

6. The flight display of claim 1 wherein the plan view comprises a compass display with the swathe lines projecting forward and parallel to an aircraft heading/track.

7. The flight display of claim 1 wherein the plan view comprises a map display with the swathe lines following an aircraft flight path.

8. The flight display of claim 1 wherein the manual means for selecting the swathe width comprises one of the group comprising a knob, joystick, toggle switch, pushbutton, and line select key.

9. A method of displaying enhanced vertical situation information of an aircraft on a flight comprising the steps of:
    displaying a side-on terrain profile view with a side-on vertical aircraft symbol and a side-on vertical terrain profile on a vertical terrain profile display of terrain in front of the aircraft over a selected range;
    selecting a swathe width for the side-on terrain profile view with a manual swathe width selecting means;
    displaying the selected swathe width on the side-on terrain profile view on a digital display;
    displaying a display of range in front of the aircraft in predetermined increments up to the selected range on the side-on profile view;
    displaying a plan view of the aircraft position having a horizontal aircraft symbol;
    displaying swathe lines on either side of the horizontal aircraft symbol on the plan view; and
    showing the selected swathe width by the spacing of the swathe lines on the plan view.

10. The flight display method of claim 9 further comprising the steps of:
    changing the vertical terrain profile display into a end-on vertical terrain profile view having an end-on vertical aircraft symbol and an end-on vertical terrain profile over the selected swathe width;
    displaying the selected range in a digital display on the end-on terrain profile view; and
    displaying the selected swathe width on each side of the aircraft on the end-on terrain profile view.

11. The flight display method of claim 10 further comprising the steps of displaying the side-on terrain profile, the end-on terrain profile, and the swathe lines in red when the terrain is at or above an aircraft altitude.

12. The flight display method of claim 10 further comprising the steps of displaying the side-on terrain profile, the end-on terrain profile, and the swathe lines in yellow when the terrain is within an predetermined distance of the aircraft.

13. The flight display method of claim 10 wherein the step of changing the vertical terrain profile display comprises utilizing one of the group comprising a knob, joystick, toggle switch, pushbutton, and line select key.

14. The flight display method of claim 9 wherein the step of displaying swathe lines on either side of the horizontal aircraft symbol further comprising the step of displaying the swathe lines projected directly forward and parallel to an aircraft heading when the plan view is displaying a compass.

15. The flight display method of claim 9 wherein the step of displaying swathe lines on either side of the horizontal aircraft symbol further comprising the step of displaying the swathe lines following an aircraft flight path when the plan view is displaying a map.

16. The flight display method of claim 9 wherein the step of selecting the swathe width comprises utilizing one of the group comprising a knob, joystick, toggle switch, pushbutton, and line select key.

17. A flight display for use in an avionics system and having a display format to show an enhanced vertical situation display of an aircraft said flight display comprising:

a vertical terrain profile display of terrain in front of the aircraft over a selected range and a selected swathe width said vertical terrain profile display displaying the selected swathe width;

a plan view display of the aircraft position said plan view further comprising swathe lines on either side of an aircraft symbol showing the selected swathe width; and means for manually selecting the swathe width.

18. The flight display of claim 17 wherein the vertical terrain profile display further comprises a side-on vertical terrain profile view comprising:

a side-on vertical terrain profile;

a side-on vertical aircraft symbol showing an altitude and position of the aircraft;

a digital display of the selected swathe width; and a display of range in front of the aircraft in predetermined increments up to the selected range on the side-on profile view.

19. The flight display of claim 17 wherein the vertical terrain profile display further comprises an end-on vertical terrain profile view comprising:

an end-on vertical terrain profile;

an end-on vertical display aircraft symbol;

a digital display of the selected range on the end-on terrain profile view; and a display of the selected swathe width on each side of the aircraft on the end-on terrain profile view.

20. The flight display of claim 17 wherein the plan view display further comprises a compass display with the swathe lines projecting forward and parallel to an aircraft heading.

21. The flight display of claim 20 wherein the plan view display further comprises a map display with the swathe lines following a aircraft flight path.

* * * * *